(12) United States Patent
Shiraishi et al.

(10) Patent No.: US 9,650,481 B2
(45) Date of Patent: May 16, 2017

(54) PROTECTIVE FILM FOR POLARIZING PLATE AND POLARIZING PLATE USING THE SAME

(71) Applicant: SUMITOMO CHEMICAL COMPANY, LIMITED, Tokyo (JP)

(72) Inventors: Takayuki Shiraishi, Niihama (JP); Koji Sumida, Niihama (JP); Tomokazu Okada, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 15/188,127

(22) Filed: Jun. 21, 2016

(65) Prior Publication Data
US 2016/0297938 A1 Oct. 13, 2016

Related U.S. Application Data

(63) Continuation of application No. 14/580,624, filed on Dec. 23, 2014, now Pat. No. 9,410,023.

(30) Foreign Application Priority Data

Dec. 27, 2013 (JP) .................. 2013-271343

(51) Int. Cl.
| | | |
|---|---|---|
| G02B 7/18 | (2006.01) |
| C08J 5/18 | (2006.01) |
| G02B 1/14 | (2015.01) |
| B32B 27/30 | (2006.01) |
| B32B 7/12 | (2006.01) |
| B32B 27/08 | (2006.01) |
| B32B 27/38 | (2006.01) |
| G02B 5/30 | (2006.01) |

(52) U.S. Cl.
CPC *C08J 5/18* (2013.01); *B32B 7/12* (2013.01); *B32B 27/08* (2013.01); *B32B 27/306* (2013.01); *B32B 27/308* (2013.01); *B32B 27/38* (2013.01); *G02B 1/14* (2015.01); *G02B 5/305* (2013.01); *G02B 5/3083* (2013.01); *B32B 2307/42* (2013.01); *B32B 2307/516* (2013.01); *B32B 2307/518* (2013.01); *B32B 2457/202* (2013.01); *B32B 2551/00* (2013.01); *C08J 2333/08* (2013.01); *C08J 2333/12* (2013.01); *C08J 2400/26* (2013.01); *C08J 2433/12* (2013.01); *C08J 2451/00* (2013.01); *G02B 5/3033* (2013.01); *Y10T 428/31855* (2015.04)

(58) Field of Classification Search
CPC ........... G02F 1/133634; G02F 1/33528; G02F 2201/50; G02B 1/105; G02B 1/14; C09J 2433/033
USPC .......... 359/485.01, 489.07, 513, 507; 349/96
See application file for complete search history.

(56) References Cited

U.S. PATENT DOCUMENTS

| | | |
|---|---|---|
| 3,793,402 A | 2/1974 | Owens |
| 2009/0153965 A1 | 6/2009 | Ito et al. |
| 2010/0002298 A1 | 1/2010 | Sugino et al. |
| 2010/0055354 A1 | 3/2010 | Sasada et al. |
| 2010/0284072 A1 | 11/2010 | Saitou |
| 2011/0128478 A1* | 6/2011 | Yamada ................. B32B 23/08 349/96 |

FOREIGN PATENT DOCUMENTS

| | | |
|---|---|---|
| JP | 55-27576 B2 | 7/1980 |
| JP | 2006-328334 A | 12/2006 |
| JP | 2007140092 A | 6/2007 |
| JP | 2008-58768 A | 3/2008 |
| JP | 2008-299096 A | 12/2008 |
| JP | 2009-134121 A | 6/2009 |
| JP | 2009-205135 A | 9/2009 |
| JP | 2010-79239 A | 4/2010 |
| JP | 2010-107953 A | 5/2010 |
| JP | 2010231015 A | 10/2010 |
| JP | 2012032819 A | 2/2012 |
| JP | 2012-159665 A | 8/2012 |
| WO | 2006/112207 A | 10/2006 |
| WO | 2009/154097 A1 | 12/2009 |

OTHER PUBLICATIONS

Communication dated Jul. 30, 2015, issued by the Korean Intellectual Property Office in corresponding Korean Application No. 10-2014-0186829.
Communication dated Nov. 18, 2015, issued by the Korean Intellectual Property Office in corresponding Korean Application No. 10-2014-0186829.
Communication dated Aug. 30, 2016 from the Japanese Patent Office in counterpart Application No. 2014-257411.
Communication dated Jan. 4, 2017 from the Japanese Patent Office in counterpart application No. 2014-257411.

* cited by examiner

*Primary Examiner* — Euncha Cherry
(74) *Attorney, Agent, or Firm* — Sughrue Mion, PLLC

(57) ABSTRACT

There are provided a protective film for a polarizing plate, wherein the protective film comprises a stretched film comprising a (meth)acryl-based resin and having an absolute value of a planar orientation coefficient ΔP of less than or equal to $2.5 \times 10^{-4}$, and a polarizing plate comprising a polarizing film, and the protective film for a polarizing plate laminated on at least one surface of the polarizing film via an adhesive layer. The stretched film can be, for example, a biaxially stretched film.

9 Claims, No Drawings

PROTECTIVE FILM FOR POLARIZING PLATE AND POLARIZING PLATE USING THE SAME

CROSS-REFERENCE TO RELATED APPLICATIONS

This is a continuation of U.S. patent application Ser. No. 14/580,624, filed Dec. 23, 2014 (now allowed), which claims benefit of priority to Japanese Patent Application No. 2013-271343 filed Dec. 27, 2013. The entire disclosures of the prior applications are considered part of the disclosure of the accompanying continuation application, and are hereby incorporated by reference.

BACKGROUND OF THE INVENTION

Field of the Invention

The present invention relates to a protective film for a polarizing plate comprising a (meth)acryl-based resin, and a polarizing plate using the same.

Description of the Background Art

A polarizing plate used in a liquid crystal display device or the like usually has a structure in which a transparent protective film is laminated on both surfaces or one surface of a polarizing film via an adhesive layer. Triacetylcellulose has previously been used widely in such a protective film for a polarizing plate, but in order to improve heat and humidity resistance and the like of the polarizing plate, use of a stretched (meth)acryl-based resin film having a low moisture permeability for the protective film has been proposed in recent years.

However, since the stretched (meth)acryl-based resin film is relatively low in adhesiveness to various surface-treatment layers which can be formed on a surface of the film, and adhesiveness to the polarizing film via an adhesive layer, there has been the following problem: the surface-treatment layer or the polarizing film is easily peeled.

As a method which can solve the problem, Japanese Patent Laying-Open No. 2009-205135 describes that an easily adhesive layer is formed on an adhesion surface to a polarizing film in a stretched (meth)acryl-based resin film using an aqueous (meth)acryl-based resin dispersion. Japanese Patent Laying-Open No. 2008-058768 describes that a coating layer including a (meth)acryl-based resin as a main component is formed on the adhesion surface.

Japanese Patent Laying-Open No. 2012-159665 describes that adhesion property between a phase retardation film and a polarizing film can be improved by setting a planar orientation coefficient of a phase retardation film surface including a norbornene-based resin, polycarbonate or triacetylcellulose to less than or equal to $0.8 \times 10^{-3}$.

SUMMARY OF THE INVENTION

An object of the present invention is to provide a protective film for a polarizing plate, wherein the protective film comprises a stretched (meth)acryl-based resin film that is excellent in adhesiveness to a surface-treatment layer or a polarizing film even when a separate layer such as the aforementioned easily adhesive layer or coating layer is not provided, and a polarizing plate using the same.

The present invention provides a protective film for a polarizing plate and a polarizing plate shown below.

[1] A protective film for a polarizing plate, wherein the protective film comprises a stretched film comprising a (meth)acryl-based resin and having an absolute value of a planar orientation coefficient $\Delta P$ of less than or equal to $2.5 \times 10^{-4}$.

[2] The protective film for a polarizing plate according to [1], wherein the stretched film comprises rubber particles.

[3] The protective film for a polarizing plate according to [1] or [2], wherein the stretched film is a biaxially stretched film.

[4] The protective film for a polarizing plate according to any of [1] to [3], wherein the stretched film has a thickness of 10 to 150 μm.

[5] The protective film for a polarizing plate according to any of [1] to [4], further comprising a surface-treatment layer laminated on the stretched film.

[6] The protective film for a polarizing plate according to any of [1] to [5], wherein the stretched film has an thickness-directional phase retardation value $R_{th}$ in a range of −35 to 35 nm.

[7] The protective film for a polarizing plate according to any of [1] to [6], wherein the stretched film has an in-plane phase retardation value $R_0$ in a range of 0 to 15 nm.

[8] A polarizing plate comprising:
a polarizing film, and
the protective film for a polarizing plate according to any of [1] to [7] laminated on at least one surface of the polarizing film via an adhesive layer.

[9] A polarizing plate according to [8], wherein the adhesive layer comprises a cured product of at least one component selected from a group consisting of an epoxy compound, an oxetane compound and a (meth)acryl-based compound.

According to the present invention, a protective film for a polarizing plate, which is excellent in adhesiveness to a surface-treatment layer or a polarizing film, can be provided. A polarizing plate of the present invention using the protective film for a polarizing plate is excellent in adhesiveness between a stretched (meth)acryl-based resin film, and a polarizing film and a surface-treatment layer, and has high durability.

DESCRIPTION OF THE PREFERRED EMBODIMENTS

<Protective Film for Polarizing Plate>

A protective film for a polarizing plate of the present invention (hereinafter, simply also referred to as "protective film") includes a stretched film including a (meth)acryl-based resin and having an absolute value of a planar orientation coefficient $\Delta P$ of less than or equal to $2.5 \times 10^{-4}$. In the present invention, the "protective film for a polarizing plate" is a film for protecting a polarizing film, which is laminated on a polarizing film, and is a film which is one constituent element of a polarizing plate. "(Meth)acryl" means methacryl and/or acryl.

(1) Planar Orientation Coefficient $\Delta P$ of Stretched Film

The stretched film (stretched (meth)acryl-based resin film) with which the protective film of the present invention is provided has an absolute value of a planar orientation coefficient $\Delta P$ of less than or equal to $2.5 \times 10^{-4}$. According to the protective film of the present invention, adhesiveness to various surface-treatment layers formed on a surface of the stretched film, or a polarizing film which is stuck to a surface of the stretched film with an adhesive layer interposed therebetween can be improved.

The planar orientation coefficient $\Delta P$ is a physical property value which is an index regarding the oriented state of a molecular chain of a polymer constituting a film.

The planar orientation coefficient ΔP is defined by the following expression:

Planar orientation coefficient $\Delta P=(n_x+n_y)/2-n_z$ wherein $n_x$ represents a refractive index in an in-plane slow axis direction (direction where the refractive index reaches the maximum in a plane) of a film, $n_y$ represents a refractive index in an in-plane fast axis direction (direction orthogonal to the in-plane slow axis direction), and $n_z$ represents a refractive index in a thickness direction of a film. For example, in the case of a film biaxially stretched in MD (Machine Direction) and TD (Transverse Direction), a greater absolute value of the planar orientation coefficient ΔP means that a molecular chain of a polymer is oriented more vertically to the thickness direction of a film. Generally, the planar orientation coefficient ΔP of the stretched (meth)acryl-based resin film takes a negative value.

From the viewpoint that adhesiveness to the surface-treatment layer or the polarizing film is enhanced, the absolute value of the planar orientation coefficient ΔP is preferably less than or equal to $2.0\times10^{-4}$. The absolute value of the planar orientation coefficient ΔP is preferably greater than or equal to $0.3\times10^{-4}$, more preferably greater than or equal to $0.9\times10^{-4}$.

An in-plane phase retardation value $R_0$ and a thickness-directional phase retardation value $R_{th}$ are defined by the following expression:

In-plane phase retardation value $R_0=(n_x-n_y)\times d$

Thickness-directional phase retardation value $R_{th}=[(n_x+n_y)/2-n_z]\times d$ wherein $n_x$ represents a refractive index in an in-plane slow axis direction (direction where the refractive index reaches the maximum in a plane) of a film, $n_y$ represents a refractive index in an in-plane fast axis direction (direction orthogonal to the in-plane slow axis direction), and $n_z$ represents a refractive index in a thickness direction of a film, and d represents a thickness of the stretched film. The in-plane phase retardation value $R_0$ is preferably 0 to 15 nm, more preferably 0 to 5 nm. The thickness-directional phase retardation value $R_{th}$ is preferably −35 to 35 nm, more preferably −10 to 10 nm.

(2) Axial Orientation of Stretched Film

The stretched film may be a uniaxially stretched film, and is usually a biaxially stretched film. Since the stretched film is more excellent in adhesiveness to the surface-treatment layer or the polarizing film, it is preferably a biaxially stretched film.

Whether the stretched film has biaxiality or not can be evaluated by measuring a $N_Z$ coefficient. The $N_Z$ coefficient is defined by the following expression:

$N_Z$ coefficient$=(n_x-n_z)/(n_x+n_y)$

Generally, in a film having biaxiality, the $N_Z$ coefficient takes a value departed from 1. To the contrary, in a film having uniaxiality, generally, the $N_Z$ coefficient is 1 or near 1.

(3) Thickness and Material of Stretched Film

The stretched film includes a (meth)acryl-based resin, and the thickness thereof can be about 10 to 150 μm, and is preferably about 20 to 100 μm, more preferably about 25 to 80 μm. The stretched film may be a film obtained by stretching a monolayer film including a (meth)acryl-based resin, or a film obtained by stretching a multilayer film including a (meth)acryl-based resin. In the case where the stretched film is a multilayer film, each layer may be formed of a (meth)acryl-based resin composition having the same composition, or may be formed of a (meth)acryl-based resin composition having different composition. For example, blending formulation of an additive can also be changed for every layer, like a laminated structure of a layer containing an ultraviolet absorbing agent and a layer not containing an ultraviolet absorbing agent.

The (meth)acryl-based resin constituting the stretched film is a polymer including a structural unit derived from a (meth)acryl-based monomer. The polymer is typically a polymer including methacrylic acid ester, and is preferably a polymer including mainly methacrylic acid ester, that is, including greater than or equal to 50% by weight of a structural unit derived from methacrylic acid ester, more preferably a polymer including greater than or equal to 80% by weight of a structural unit derived from methacrylic acid ester, based on the total monomer amount. The (meth)acryl-based resin may be a homopolymer of methacrylic acid ester, or may be a copolymer including greater than or equal to 50% by weight of a structural unit derived from methacrylic acid ester and less than or equal to 50% by weight of a structural unit derived from other polymerizable monomer based on the total monomer amount.

As the methacrylic acid ester which can constitute the (meth)acryl-based resin, methacrylic acid alkyl ester can be used. Specific examples thereof include methacrylic acid alkyl esters in which an alkyl group has 1 to 8 carbon atoms, such as methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, cyclohexyl methacrylate, and 2-hydroxyethyl methacrylate. The number of carbon atoms in the alkyl group is preferably 1 to 4. In the (meth)acryl-based resin, only one methacrylic acid ester may be used alone, or two or more methacrylic acid esters may be used in combination.

Among them, from the viewpoint of durability, the (meth)acryl-based resin preferably includes a structural unit derived from methyl methacrylate, and more preferably includes greater than or equal to 50% by weight, further preferably greater than or equal to 80% by weight of this structural unit based on the total monomer amount.

Examples of other polymerizable monomer which can constitute the (meth)acryl-based resin include acrylic acid ester, and a polymerizable monomer other than methacrylic acid ester and acrylic acid ester. As the acrylic acid ester, acrylic acid alkyl ester can be used. Specific examples thereof include acrylic acid alkyl esters in which an alkyl group has 1 to 8 carbon atoms, such as methyl acrylate, ethyl acrylate, n-propyl acrylate, isopropyl acrylate, n-butyl acrylate, isobutyl acrylate, t-butyl acrylate, 2-ethylhexyl acrylate, cyclohexyl acrylate, and 2-hydroxyethyl acrylate. The number of carbon atoms in the alkyl group is preferably 1 to 4. In the (meth)acryl-based resin, only one acrylic acid ester may be used alone, or two or more acrylic acid esters may be used in combination.

Examples of the polymerizable monomer other than methacrylic acid ester and acrylic acid ester include a monofunctional monomer having one polymerizable carbon-carbon double bond in a molecule, and a polyfunctional monomer having at least two polymerizable carbon-carbon double bonds in a molecule, and the monofunctional monomer is preferably used. Specific examples of the monofunctional monomer include styrene-based monomers such as styrene, α-methylstyrene, vinyltoluene, and halogenated styrene; alkenyl cyanides such as acrylonitrile and methacrylonitrile; unsaturated acids such as acrylic acid, methacrylic acid, and maleic anhydride; and N-substituted maleimides.

Specific examples of the polyfunctional monomer include poly-unsaturated carboxylic acid esters of a polyhydric alcohol, such as ethylene glycol dimethacrylate, butanediol dimethacrylate, and trimethylolpropane triacrylate; alkenyl esters of an unsaturated carboxylic acid, such as allyl acrylate, allyl methacrylate, and allyl cinnamate; polyalkenyl esters of a polybasic acid, such as diallyl phthalate, diallyl maleate, triallyl cyanurate, and triallyl isocyanurate, and aromatic polyalkenyl compounds such as divinylbenzene. Only one polymerizable monomer other than methacrylic acid ester and acrylic acid ester may be used alone, or two or more of such polymerizable monomers may be used in combination.

As preferable monomer composition of the (meth)acryl-based resin, methacrylic acid alkyl ester is 50 to 100% by weight, acrylic acid alkyl ester is 0 to 50% by weight, and a polymerizable monomer other than them is 0 to 50% by weight, more preferably, methacrylic acid alkyl ester is 50 to 99.9% by weight, acrylic acid alkyl ester is 0.1 to 50% by weight, and a polymerizable monomer other than them is 0 to 49.9% by weight, and further preferably, methacrylic acid alkyl ester is 80 to 99.9% by weight, acrylic acid alkyl ester is 0.1 to 20% by weight, and a polymerizable monomer other than them is 0 to 19.9% by weight, based on the total monomer amount.

A monomer composition including the monomer as described above can be subjected to radical polymerization to thereby prepare the (meth)acryl-based resin. The monomer composition may include a solvent and a polymerization initiator, if necessary.

The stretched film may contain one or two or more of additives such as rubber particles, a lubricant, a fluorescent brightening agent, a dispersant, a heat stabilizer, a light stabilizer, an ultraviolet absorbing agent, an infrared absorbing agent, an antistatic agent, and an antioxidant, if necessary.

Blending of rubber particles in the stretched film is advantageous for further improving adhesiveness to the surface-treatment layer or the polarizing film. Further, the rubber particles can also be blended to thereby improve film-forming property of the (meth)acryl-based resin, slippage of a stretched film surface, and the like.

The rubber particle as used herein refers to a rubber elastic body particle including a layer exhibiting rubber elasticity. The rubber particle may be a particle including only a layer exhibiting rubber elasticity, or may be a particle of a multilayer structure having other layer together with a layer exhibiting rubber elasticity. Examples of the rubber elastic body include an olefin-based elastic polymer, a diene-based elastic polymer, a styrene-diene-based elastic copolymer, and an acryl-based elastic polymer. Among them, from the viewpoints of light resistance and transparency of the stretched film, an acryl-based elastic polymer is preferably used.

The acryl-based elastic polymer can be a polymer including mainly alkyl acrylate, that is, including greater than or equal to 50% by weight of a structural unit derived from alkyl acrylate, based on the total monomer amount. The acryl-based elastic polymer may be a homopolymer of alkyl acrylate, or may be a copolymer including greater than or equal to 50% by weight of a structural unit derived from alkyl acrylate, and less than or equal to 50% by weight of a structural unit derived from other polymerizable monomer.

As the alkyl acrylate constituting the acryl-based elastic polymer, usually, alkyl acrylate in which an alkyl group has 4 to 8 carbon atoms is used. Examples of other polymerizable monomer include monofunctional monomers, for example, alkyl methacrylates such as methyl methacrylate and ethyl methacrylate; styrene-based monomers such as styrene and alkylstyrene; and unsaturated nitriles such as acrylonitrile and methacrylonitrile, and also polyfunctional monomers, for example, alkenyl esters of an unsaturated carboxylic acid, such as allyl (meth)acrylate and methallyl (meth)acrylate; dialkenyl esters of a dibasic acid, such as diallyl maleate; and unsaturated carboxylic acid diesters of glycols, such as alkylene glycol di(meth)acrylate.

The rubber particle including the acryl-based elastic polymer is preferably a particle of a multilayer structure having a layer of the acryl-based elastic polymer. Specifically, examples include a particle of a two-layer structure having a hard polymer layer mainly including alkyl methacrylate on the outside of the layer of the acryl-based elastic polymer, and a particle of a three-layer structure further having a hard polymer layer mainly including alkyl methacrylate on the inside of the layer of the acryl-based elastic polymer.

Examples of monomer composition in the polymer including mainly alkyl methacrylate constituting a hard polymer layer formed on the outside or inside of the layer of the acryl-based elastic polymer are the same as examples of monomer composition of the polymer including mainly alkyl methacrylate, listed as examples of the (meth)acryl-based resin, and particularly, the monomer composition including mainly methyl methacrylate is preferably used. The acryl-based rubber elastic body particle of such a multilayer structure can be produced, for example, by the method described in Japanese Patent Publication No. 55-27576.

The rubber particle preferably has an average particle diameter, up to the rubber elastic body layer (the layer of the acryl-based elastic polymer) included therein, in the range of 10 to 350 nm. The average particle diameter in such a range is advantageous for improving adhesiveness to the surface-treatment layer or the polarizing film. In addition, slight irregularities are formed on a film surface, and therefore slippage of the stretched film can be enhanced. The average particle diameter is more preferably greater than or equal to 30 nm, further preferably greater than or equal to 50 nm, and more preferably less than or equal to 300 nm, further preferably less than or equal to 280 nm.

The average particle diameter of the rubber particle, up to the rubber elastic body layer (the layer of the acryl-based elastic polymer), is measured as follows. That is, when such a rubber particle is mixed into the (meth)acryl-based resin to form the mixture into a film, and a cross section thereof is stained with an aqueous solution of ruthenium oxide, only the rubber elastic body layer is colored, an approximately circular shape is observed, and the (meth)acryl-based resin of a base layer is not stained. Then, from a film cross section stained in this way, a thin piece is prepared using a microtome or the like, and this is observed with an electron microscope. Then, 100 rubber particles stained are randomly extracted, the respective particle diameters (diameters up to the rubber elastic body layer) are calculated, and the number average thereof is defined as the average particle diameter. Since the particle diameter is measured by such a method, the resulting average particle diameter is the number average particle diameter.

In the case of the rubber particle in which an outermost layer is made of a hard polymer including mainly methyl methacrylate and the rubber elastic body layer (the layer of the acryl-based elastic polymer) is wrapped therein, when the rubber particle is mixed into the (meth)acryl-based resin being a matrix, the outermost layer of the rubber particle is immingled with the (meth)acryl-based resin being a matrix.

For this reason, when a cross section thereof is stained with ruthenium oxide and observed with an electron microscope, the rubber particle is observed as a particle in the state where the outermost layer is removed. Specifically, in the case of the rubber particle of a two-layer structure in which an inner layer is made of an acryl-based elastic polymer and an outer layer is made of a hard polymer including mainly methyl methacrylate, an acryl-based elastic polymer part of the inner layer is stained, and the rubber particle is observed as a particle of a monolayer structure. In addition, in the case of the rubber particle of a three-layer structure in which an innermost layer is made of a hard polymer including mainly methyl methacrylate, an intermediate layer is made of an acryl-based elastic polymer, and an outermost layer is made of a hard polymer including mainly methyl methacrylate, a particle central part of the innermost layer is not stained, and the rubber particle is observed as a particle of a two-layer structure in which only an acryl-based elastic polymer part of the intermediate layer is stained.

From the viewpoints of adhesiveness to the surface-treatment layer or the polarizing film, film-forming property of the (meth)acryl-based resin, slippage of the stretched film surface, and the like, the rubber particles are preferably blended in a proportion of less than or equal to 45% by weight, more preferably less than or equal to 35% by weight, further preferably less than or equal to 30% by weight, based on the total amount with the (meth)acryl-based resin constituting the stretched film.

In the case where the stretched film includes the rubber particles, a (meth)acryl-based resin composition including the rubber particles used for producing the stretched film can be obtained by mixing the (meth)acryl-based resin and the rubber particles by melt kneading or the like, or can also be obtained by a method of first preparing the rubber particles, and polymerizing a monomer composition serving as a raw material of the (meth)acryl-based resin, in the presence of the rubber particles.

In addition, when a lubricant is contained in the stretched film, winding tightening when the stretched film is wound into a roll can be prevented, and thus a packing style in the wound state is improved. The lubricant may be one having the function of improving slippage of the stretched film surface, and examples thereof include a stearic acid-based compound, a (meth)acryl-based compound, and an ester-based compound. Among them, the stearic acid-based compound is preferably used as the lubricant.

Examples of the stearic acid-based compound which is the lubricant include stearic acid esters such as methyl stearate, ethyl stearate, and stearic acid monoglyceride; stearic acid amides; stearic acid metal salts such as sodium stearate, calcium stearate, zinc stearate, lithium stearate, and magnesium stearate; and 12-hydroxystearic acids and metal salts thereof, such as 12-hydroxystearic acid, sodium 12-hydroxystearate, zinc 12-hydroxystearate, calcium 12-hydroxystearate, lithium 12-hydroxystearate, and magnesium 12-hydroxystearate, in addition to stearic acid itself. Among them, stearic acid is preferably used.

The blending amount of the lubricant is usually in the range of less than or equal to 0.15 parts by weight, preferably less than or equal to 0.1 parts by weight, and more preferably less than or equal to 0.07 parts by weight, based on 100 parts by weight of the total amount of the (meth) acryl-based resin and the rubber particles. When the blending amount of the lubricant is too large, there is a possibility that the lubricant is bled out from the stretched film, or transparency of the film is deteriorated.

The ultraviolet absorbing agent is a compound which absorbs an ultraviolet ray having a wavelength of less than or equal to 400 nm. The ultraviolet absorbing agent can be blended into the stretched film to thereby improve durability (light resistance) of a polarizing plate in which a protective film including this stretched film is stuck to a polarizing film. That is, the ultraviolet absorbing agent can be contained in the stretched film to efficiently shield ultraviolet rays without deteriorating a color tone of a polarizing plate including the film as a protective film, and to suppress reduction in the polarization degree in use of a polarizing plate for a long term.

As the ultraviolet absorbing agent, a known ultraviolet absorbing agent such as a benzophenone-based ultraviolet absorbing agent, a benzotriazole-based ultraviolet absorbing agent, or an acrylonitrile-based ultraviolet absorbing agent can be used.

Specific examples of the ultraviolet absorbing agent include 2,2'-methylenebis[4-(1,1,3,3-tetramethylbutyl)-6-(2H-benzotriazol-2-yl)phenol], 2-(2'-hydroxy-3'-t-butyl-5'-methylphenyl)-5-chlorobenzotriazole, 2,4-di-t-butyl-6-(5-chlorobenzotriazol-2-yl)phenol, 2,2'-dihydroxy-4,4'-dimethoxybenzophenone, and 2,2',4,4'-tetrahydroxybenzophenone. Among them, 2,2'-methylenebis[4-(1,1,3,3-tetramethylbutyl)-6-(2H-benzotriazol-2-yl)phenol] is one of preferable ultraviolet absorbing agents.

The blending amount of the ultraviolet absorbing agent can be selected in such a range that the light transmittance of the stretched film at a wavelength of less than or equal to 370 nm is preferably less than or equal to 10%, more preferably less than or equal to 5%, and further preferably less than or equal to 2%. In addition, it is also preferable to blend the ultraviolet absorbing agent so that transmittance of the stretched film at a wavelength of 380 nm is less than or equal to 25%, further less than or equal to 15%, and particularly less than or equal to 7%. The specific blending amount of the ultraviolet absorbing agent may be determined so that the light transmittance is satisfied.

The infrared absorbing agent is a compound which absorbs an infrared ray having a wavelength of greater than or equal to 800 nm, and examples include a nitroso compound or a metal complex salt thereof, a cyanine-based compound, a squarylium-based compound, a thiol nickel complex salt-based compound, a phthalocyanine-based compound, a naphthalocyanine-based compound, a triarylmethane-based compound, an imonium-based compound, a diimonium-based compound, a naphthoquinone-based compound, an anthraquinone-based compound, an amino compound, an aminium salt-based compound, carbon black, indium tin oxide, antimony tin oxide, and oxides, carbides or borides of metals belonging to Group 4A, Group 5A or Group 6A of the Periodic Table. These infrared absorbing agents are preferably selected so that the whole infrared ray (light in the wavelength range of about 800 to 1100 nm) can be absorbed, and two or more may be used in combination. The blending amount of the infrared absorbing agent is preferably selected so that the light transmittance of the stretched film at a wavelength of greater than or equal to 800 nm is less than or equal to 10%.

The central line average roughness of at least one surface of the stretched film is preferably less than or equal to ⅓ of the number average particle diameter of the rubber particle, is preferably about 0.01 to 0.05 μm, and more preferably, both of them are satisfied. In addition, the surface thus adjusted is preferably a surface stuck to a polarizing film.

The central line average roughness is a value measured according to the method defined in JIS B 0601.

The central line average roughness of a surface of the stretched film can be greater than or equal to 0.01 μm to thereby suppress blocking between films when the film itself is prepared into the wound shape. In addition, the central line average roughness can be less than or equal to 0.05 μm to thereby enhance adhesiveness to a polarizing film with an adhesive layer interposed, and, at the same time, to suppress deterioration of display quality of a liquid crystal display device, such as whitening of a screen and deterioration of a contrast due to the roughness of a stretched film surface.

The stretched film can contain a solvent remaining in the (meth)acryl-based resin, or a solvent derived from a solvent if necessary added to the (meth)acryl-based resin composition, and it is preferable that the amount of the remaining solvent included in the stretched film is less than or equal to 0.01% by weight based on the weight of the film. The amount of the remaining solvent can be obtained as a weight loss value when the stretched film is heated at 200° C. for 30 minutes, or as a quantitative value by gas chromatography of an amount of a gas generated by the heating.

When the amount of the remaining solvent is less than or equal to 0.01% by weight, deformation of a protective film can be prevented and, at the same time, deterioration of optical performance of the protective film and the polarizing plate can be prevented, for example, even when a polarizing plate is exposed under a high temperature-high humidity environment.

(4) Surface-Treatment Layer

The protective film of the present invention can be provided with the surface-treatment layer laminated on the stretched film. The surface-treatment layer is a layer formed on the stretched film surface. The surface-treatment layer can be imparted to the stretched film to thereby impart the specified function depending on the kind of the surface-treatment layer to the protective film. Examples of the surface-treatment layer include

[a] a hard coat layer for preventing a scratch of a surface,
[b] an antistatic layer,
[c] a antireflection layer,
[d] an antifouling layer, and
[e] an antiglare layer responsible for improvement in visibility, prevention of a glare of light from outside, reduction in moire due to interference between a prism sheet and a color filter, and the like.

[Hard Coat Layer]

The hard coat layer has the function of enhancing the surface hardness of the stretched film, and is provided for the purpose of preventing a scratch of a surface, or the like. The hard coat layer preferably exhibits H or a harder value by a pencil hardness test (measurement is performed by placing an optical film having a hard coat layer on a glass plate) defined in JIS K 5600-5-4: 1999 "Paint General Test Method-Part 5: Mechanical Property of Coating Film-Section 4: Scratching Hardness (Pencil Method)".

A material forming the hard coat layer is generally cured by heat or light. Examples include organic hard coat materials such as organic silicone-based, melamine-based, epoxy-based, (meth)acryl-based, and urethane (meth)acrylate-based hard coat materials, and inorganic hard coat materials such as silicon dioxide. Among them, a urethane (meth)acrylate-based or polyfunctional (meth)acrylate-based hard coat material is preferably used because of being good in adhesiveness to the stretched film and excellent in productivity.

The hard coat layer can optionally contain various fillers for the purposes of adjusting refractive index, improving flexural modulus, stabilizing volume shrinkage rate, and also improving heat resistance, antistatic property, antiglare property and the like. In addition, the hard coat layer can also contain additives such as an antioxidant, an ultraviolet absorbing agent, a light stabilizer, an antistatic agent, a leveling agent, and an anti-foaming agent.

[Antistatic Layer]

The antistatic layer is provided for the purpose of imparting electric conductivity to a surface of the stretched film, suppressing influence by static electricity, or the like. For forming the antistatic layer, for example, a method of coating the stretched film with a resin composition containing an electrically conductive substance (antistatic agent) can be adopted. For example, the antistatic agent can coexist in a hard coat material used for forming the hard coat layer, to thereby form an antistatic hard coat layer.

[Antireflection Layer]

The antireflection layer is a layer for preventing reflection of light from outside, and is provided on a surface of the stretched film directly or with other layer such as a hard coat layer interposed therebetween. In the stretched film having the antireflection layer, reflectivity at an incident angle of 5° to light having a wavelength of 430 to 700 nm is preferably less than or equal to 2%, and reflectivity at the same incident angle to light having a wavelength of 550 nm is more preferably less than or equal to 1%.

The thickness of the antireflection layer can be about 0.01 to 1 μm, and is preferably 0.02 to 0.5 μm. The antireflection layer can be one including a low refractive index layer having a refractive index lower than the refractive index of a layer on which the antireflection layer is provided [stretched film, hard coat layer, or the like], specifically, a refractive index of 1.30 to 1.45, one in which a low refractive index layer of a thin film including an inorganic compound and a high refractive index layer of a thin film including an inorganic compound are alternately laminated plurally, or the like.

A material forming the low refractive index layer is not particularly limited as far as it has a low refractive index. Examples include resin materials such as an ultraviolet curable (meth)acryl resin; hybrid materials in which inorganic fine particles such as colloidal silica are dispersed in a resin; and sol-gel materials including alkoxysilane. Such a low refractive index layer may be formed by coating with a polymerized polymer, or may be formed by coating in the state of a monomer or an oligomer being a precursor, followed by polymerization and curing. In addition, each material preferably includes a compound having a fluorine atom in a molecule in order to impart antifouling property.

As the sol-gel material for forming the low refractive index layer, a material having a fluorine atom in a molecule is suitably used. Typical examples of the sol-gel material having a fluorine atom in a molecule include polyfluoroalkylalkoxysilane.

Polyfluoroalkylalkoxysilane can be, for example, a compound represented by the following formula:

$$CF_3(CF_2)_nCH_2CH_2Si(OR)_3$$

wherein R represents an alkyl group having 1 to 5 carbon atoms, and n represents an integer of 0 to 12. In particular, a compound in which n in the formula is 2 to 6 is preferable.

Specific examples of polyfluoroalkylalkoxysilane include the following compounds:
3,3,3-trifluoropropyltrimethoxysilane,
3,3,3-trifluoropropyltriethoxysilane, 3,3,4,4,5,5,6,6,7,7,8,8,8-tridecafluorooctyltrimethoxysilane, 3,3,4,4,5,5,6,6,7,7,8,8,8-tridecafluorooctyltriethoxysilane, 3,3,4,4,5,5,6,6,7,7,8,8,9,9,10,10,10-heptadecafluorodecyltrimethoxysilane, and 3,3,4,4,5,5,6,6,7,7,8,8,9,9,10,10,10-heptadecafluorodecyltriethoxysilane.

The low refractive index layer can also be constituted by a cured product of a thermosetting fluorine-containing compound or an active energy ray curable fluorine-containing compound. In this cured product, a dynamic friction coefficient is preferably in the range of 0.03 to 0.15, and a contact angle to water is preferably in the range of 90 to 120°. Examples of the curable fluorine-containing compound include a fluorine-containing polymer having a crosslinkable functional group, in addition to a polyfluoroalkyl group-containing silane compound (e.g., the aforementioned 3,3,4,4,5,5,6,6,7,7,8,8,9,9,10,10,10-heptadecafluorodecyltriethoxysilane).

The fluorine-containing polymer having a crosslinkable functional group can be produced by 1) a method of copolymerizing a fluorine-containing monomer and a monomer having a crosslinkable functional group, or 2) a method of copolymerizing a fluorine-containing monomer and a monomer having a functional group, and then, adding a compound having a crosslinkable functional group to the functional group in a polymer.

Examples of the fluorine-containing monomer include fluoroolefins such as fluoroethylene, vinylidene fluoride, tetrafluoroethylene, hexafluoropropylene, and perfluoro-2,2-dimethyl-1,3-dioxole; partial or completely fluorinated alkyl ester derivatives of (meth)acrylic acid; and completely or partially fluorinated vinyl ethers of (meth)acrylic acid.

Examples of the monomer having a crosslinkable functional group or the compound having a crosslinkable functional group include monomers having a glycidyl group, such as glycidyl acrylate and glycidyl methacrylate; monomers having a carboxyl group, such as acrylic acid and methacrylic acid; monomers having a hydroxyl group, such as hydroxyalkyl acrylate and hydroxyalkyl methacrylate; monomers having an alkenyl group, such as allyl acrylate and allyl methacrylate; monomers having an amino group; and monomers having a sulfonic acid group.

The material for forming the low refractive index layer can also be constituted by a material including a sol in which inorganic compound fine particles of silica, alumina, titania, zirconia, magnesium fluoride, or the like are dispersed in an alcohol solvent because scratch resistance can be improved. As the inorganic compound fine particle used therefor, a fine particle having a lower refractive index is preferable from the viewpoint of reflection preventing property. This inorganic compound fine particle may have voids, and particularly, a hollow fine particle of silica is preferable. The average particle diameter of the hollow fine particle is preferably in the range of 5 to 2000 nm, and inter alia, more preferably in the range of 20 to 100 nm. The average particle diameter as used herein refers to the number average particle diameter obtained by observation with a transmission electron microscope.

[Antifouling Layer]

The antifouling layer is provided in order to impart water repellency, oil repellency, perspiration resistance, antifouling property, or the like. A suitable material for forming the antifouling layer is a fluorine-containing organic compound. Examples of the fluorine-containing organic compound include fluorocarbon, perfluorosilane, and polymers of them.

As a method of forming the antifouling layer, a physical vapor growth method, representatives of which are deposition and sputtering, a chemical vapor growth method, a wet coating method, or the like can be used, depending on the material used. The average thickness of the antifouling layer is usually about 1 to 50 nm, and preferably 3 to 35 nm.

[Antiglare Layer]

The antiglare layer is a layer having a fine irregular shape on a surface, and is preferably formed using the aforementioned hard coat material.

The antiglare layer having a fine irregular shape on a surface can be formed by 1) a method of forming a coating film containing fine particles on the stretched film, and providing irregularities based on the fine particles, 2) a method of forming a coating film containing fine particles or not containing fine particles on the stretched film, and then pushing a mold (roll etc.) with an irregular shape imparted thereto against a surface, to transfer the irregular shape (also called emboss method) or the like.

In the method of 1), the antiglare layer can be formed by coating the stretched film with a curable resin composition including a curable transparent resin and fine particles, and curing a coating layer by irradiation with light such as an ultraviolet ray, or by heating. The curable transparent resin is preferably selected from materials by which a high hardness is obtained (hard coat). As such a curable transparent resin, a photocurable resin such as an ultraviolet curable resin, a thermosetting resin, an electron beam curable resin or the like can be used, and from the viewpoints of productivity and the hardness of the resulting antiglare layer, the photocurable resin is preferably used, and more preferable is the ultraviolet curable resin. When the photocurable resin is used, the curable resin composition further includes a photopolymerization initiator.

As the photocurable resin, generally, polyfunctional (meth)acrylate is used. Specific examples thereof include di- or tri-(meth)acrylates of trimethylolpropane; tri- or tetra-(meth)acrylates of pentaerythritol; and polyfunctional urethane (meth)acrylaes which are each a reaction product of (meth)acrylate having at least one hydroxyl group in a molecule and a diisocyanate. These polyfunctional (meth)acrylates can be used alone, respectively, or can be used by combining two or more of them, if necessary.

Alternatively, a mixture of polyfunctional urethane (meth)acrylate, polyol (meth)acrylate, and a (meth)acryl polymer having an alkyl group including two or more hydroxyl groups can also be used as the photocurable resin. The polyfunctional urethane (meth)acrylate constituting this photocurable resin can be produced, for example, using (meth)acrylic acid and/or (meth)acrylic acid ester, a polyol, and a diisocyanate. Specifically, the polyfunctional urethane (meth)acrylate can be produced by preparing hydroxy(meth)acrylate having at least one hydroxyl group in a molecule from (meth)acrylic acid and/or (meth) acrylic acid ester and a polyol, and reacting this with a diisocyanate. The polyfunctional urethane (meth)acrylate thus produced is the photocurable resin itself listed above. Upon production of it, one kind of each of (meth)acrylic acid and/or (meth)acrylic acid ester can be used, or two or more kinds thereof can also be used in combination, and similarly, one kind of each of a polyol and a diisocyanate can be used, or two or more kinds thereof can also be used in combination.

The (meth)acrylic acid ester which is one raw material of the polyfunctional urethane (meth)acrylate can be a linear or cyclic alkyl ester of (meth)acrylic acid. Specific examples thereof include alkyl (meth)acrylates such as methyl (meth)acrylate, ethyl (meth)acrylate, propyl (meth)acrylate, isopropyl (meth)acrylate, and butyl (meth)acrylate, and cycloalkyl (meth)acrylates such as cyclohexyl (meth)acrylate.

The polyol which is another raw material of the polyfunctional urethane (meth)acrylate is a compound having at least two hydroxyl groups in a molecule. Examples include ethylene glycol, propylene glycol, 1,3-propanediol, diethylene glycol, dipropylene glycol, neopentyl glycol, 1,3-butanediol, 1,4-butanediol, 1,6-hexanediol, 1,9-nonanediol, 1,10-decanediol, 2,2,4-trimethyl-1,3-pentanediol, 3-methyl-1,5-pentanediol, neopentyl glycol ester of hydroxypivalic acid, cyclohexane dimethylol, 1,4-cyclohexanediol, spiroglycol, tricyclodecane dimethylol, hydrogenated bisphenol A, ethylene oxide-added bisphenol A, propylene oxide-added bisphenol A, trimethylolethane, trimethylolpropane, glycerin, 3-methylpentane-1,3,5-triol, pentaerythritol, dipentaerythritol, tripentaerythritol, and glucoses.

The diisocyanate which is still another raw material of the polyfunctional urethane (meth)acrylate is a compound having two isocyanato groups (—NCO) in a molecule, and aromatic, aliphatic or alicyclic various diisocyanates can be used. Specific examples include tetramethylene diisocyanate, hexamethylene diisocyanate, isophorone diisocyanate, 2,4-tolylene diisocyanate, 4,4'-diphenyl diisocyanate, 1,5-naphthalene diisocyanate, 3,3'-dimethyl-4,4'-diphenyl diisocyanate, xylene diisocyanate, trimethylhexamethylene diisocyanate, 4,4'-diphenylmethane diisocyanate, and nuclear hydrogenated products of diisocyanates having an aromatic ring among them.

The polyol (meth)acrylate which constitutes the photocurable resin together with the polyfunctional urethane (meth)acrylate is (meth)acrylate of a compound having at least two hydroxyl groups in a molecule (i.e., polyol). Specific examples thereof include pentaerythritol di(meth)acrylate, pentaerythritol tri(meth)acrylate, pentaerythritol tetra(meth)acrylate, dipentaerythritol hexa(meth)acrylate, and 1,6-hexanediol di(meth)acrylate. Only one polyol (meth)acrylate may be used alone, or two or more polyol (meth)acrylates may be used in combination. Polyol (meth)acrylate preferably includes pentaerythritol triacrylate and/or pentaerythritol tetraacrylate.

Further, the (meth)acryl polymer having an alkyl group including two or more hydroxyl groups, which constitutes the photocurable resin together with the polyfunctional urethane (meth)acrylate and the polyol (meth)acrylate, has an alkyl group including two or more hydroxyl groups in one structural unit. Examples include a polymer including 2,3-dihydroxypropyl (meth)acrylate as a structural unit, and a polymer including, as a structural unit, 2-hydroxyethyl (meth)acrylate together with 2,3-dihydroxypropyl (meth)acrylate.

Since use of the above-exemplified (meth)acryl-based photocurable resin is advantageous from the viewpoint of adhesiveness to the stretched film and, at the same time, improves mechanical strength, the use is also advantageous for obtaining an antiglare film (protective film with an antiglare layer) which can effectively prevent a scratch of a surface.

It is preferable to use, as the fine particle, a fine particle having an average particle diameter of 0.5 to 5 µm, and having a difference in refractive index from a curable transparent resin after cured of 0.02 to 0.2. The fine particle having the average particle diameter and the difference in refractive index in this range can be used to thereby effectively exhibit haze. The average particle diameter of this fine particle can be determined by a dynamic light scattering method or the like. The average particle diameter in this case is the weight average particle diameter.

The fine particle can be an organic fine particle or an inorganic fine particle. As the organic fine particle, generally, a resin particle is used, and examples include a crosslinked poly(meth)acrylic acid particle, a methyl methacrylate/styrene copolymer resin particle, a crosslinked polystyrene particle, a crosslinked polymethyl methacrylate particle, a silicone resin particle, and a polyimide particle. In addition, as the inorganic fine particle, silica, colloidal silica, alumina, alumina sol, aluminosilicate, an alumina-silica composite oxide, kaolin, talc, mica, calcium carbonate, calcium phosphate or the like can be used.

As the photopolymerization initiator, various photopolymerization initiators such as acetophenone-based, benzophenone-based, benzoin ether-based, amine-based, and phosphine oxide-based photopolymerization initiators can be used. Examples of a compound which is classified as the acetophenone-based photopolymerization initiator include 2,2-dimethoxy-2-phenylacetophenone (another name: benzyl dimethyl ketal), 2,2-diethoxyacetophenone, 1-(4-isopropylphenyl)-2-hydroxy-2-methylpropan-1-one, 1-hydroxycyclohexyl phenyl ketone, and 2-methyl-2-morpholino-1-(4-methylthiophenyl)propan-1-one. Examples of a compound which is classified as the benzophenone-based photopolymerization initiator include benzophenone, 4-chlorobenzophenone, and 4,4'-dimethoxybenzophenone. Examples of a compound which is classified as the benzoin ether-based photopolymerization initiator include benzoin methyl ether and benzoin propyl ether. Examples of a compound which is classified as the amine-based photopolymerization initiator include N,N, N',N'-tetramethyl-4,4'-diaminobenzophenone (another name: Michler' s ketone). Examples of the phosphine oxide-based photopolymerization initiator include 2,4,6-trimethylbenzoyldiphenylphosphine oxide. In addition, a xanthone-based compound and a thioxanthone-based compound can also be used as the photopolymerization initiator.

These photopolymerization initiators are commercially available. As a trade name of an example of a representative commercially available product, there are "Irgacure 907", "Irgacure 184", and "Lucirin TPO" which are sold from German company, BASF.

The curable resin composition can include a solvent, if necessary. As the solvent, any organic solvent which can solve respective components constituting the curable resin composition, such as ethyl acetate and butyl acetate, can be used. Two or more organic solvents can also be used as a mixture.

In addition, the curable resin composition may contain a leveling agent, and for example, a fluorine-based or silicone-based leveling agent can be used. As the silicone-based leveling agent, there are reactive silicone, polydimethylsiloxane, polyether-modified polydimethylsiloxane, polymethylalkylsiloxane, and the like. Among the silicone-based leveling agents, preferred are reactive silicone and a siloxane-based leveling agent. When the leveling agent including the reactive silicone is used, slippage is imparted to an antiglare layer surface, and excellent scratch resistance can be maintained for a long term. In addition, when the siloxane-based leveling agent is used, film moldability can be improved.

On the other hand, when the antiglare layer having a fine surface irregular shape is formed by the method of 2) (emboss method), a mold on which a fine irregular shape is formed may be used to transfer a shape of the mold onto a resin layer formed on the stretched film. When the fine surface irregular shape is formed by the emboss method, a resin layer onto which an irregular shape is transferred may contain a fine particle, or may not contain a fine particle. A resin constituting the resin layer is preferably the photocurable resin as exemplified in the method of 1), and more preferably an ultraviolet curable resin. However, by appropriately selecting a photopolymerization initiator, a visible light curable resin which can be cured with visible light having a longer wavelength than that of an ultraviolet ray can also be used in place of the ultraviolet curable resin.

In the emboss method, an irregular shape of a mold is transferred onto a coating layer by coating the stretched film with a curable resin composition including a photocurable resin such as an ultraviolet curable resin, and curing the coating layer while pushing it against the irregular surface of a mold. More specifically, the irregular shape of a mold is transferred onto an antiglare layer by coating the stretched film with a curable resin composition, curing the coating layer by irradiating it with light such as an ultraviolet ray from a stretched film side in the state where the coating layer is closely attached to the irregular surface of a mold, and then peeling the stretched film having the coating layer (antiglare layer) after curing, from the mold.

The thickness of the antiglare layer is not particularly limited, but is generally 2 to 30 µm, preferably greater than or equal to 3 µm, and preferably less than or equal to 20 µm. When the antiglare layer is too thin, a sufficient hardness is not obtained, and a surface tends to be easily scratched, and on the other hand, when the antiglare layer is too thick, there is a tendency that the layer is easily cracked or a film is curled by curing and shrinkage of the antiglare layer to deteriorate productivity.

The haze value of the stretched film having the antiglare layer is preferably in the range of 5 to 50%. When the haze value is too small, a sufficient antiglare performance is not obtained, and when a polarizing plate provided with the stretched film with the antiglare layer is applied to an image display device, glare of light from outside is easily generated on a screen. On the other hand, when the haze value is too large, glare of light from outside is reduced, but firmness of a screen of black display is deteriorated. The haze value is the ratio of the diffusion transmittance relative to the total light transmittance, and is measured in accordance with JIS K 7136: 2000 "How to Determine Haze of Plastic-Transparent Material".

<Method for Producing Stretched Film>

The stretched film according to the present invention, including a (meth)acryl-based resin and having an absolute value of a planar orientation coefficient ΔP of less than or equal to $2.5 \times 10^{-4}$, can be obtained by forming a film of a (meth)acryl-based resin composition including the (meth)acryl-based resin by a general film-forming method, followed by stretching.

As the film-forming method, a melt extrusion film-forming method is preferably adopted. The melt extrusion film-forming method usually refers to a method of placing a thermoplastic resin into an extruder to melt it, extruding a film-like molten resin from a T die, drawing it onto a cooling roll as it is, and cooling and solidifying it to continuously obtain a long film. The lip interval of the T die or the like can be appropriately controlled to thereby determine the thickness of a film. Thereupon, the surface roughness of the cooling roll used can be adjusted to control the central line average roughness of a surface of an unstretched (meth)acryl-based resin, consequently, a stretched film in a desired range. In addition, for example, a vent hole can be provided at a convenient portion of an extruder, and the pressure of the interior of the extruder can be reduced through the hole, to thereby reduce the amount of the remaining solvent of the unstretched (meth)acryl-based resin, consequently, the stretched film to a desired degree.

As described above, the stretched film can also be a multilayer film, and in this case, in order to obtain the unstretched (meth)acryl-based resin film of a multilayer structure, usually, a coextrusion method of arranging a plurality of extruders in a melt extrusion film-forming method, and performing extrusion so that molten resins passing through the respective extruders form a multilayer in a T die is adopted. In addition, examples of other method for forming a multilayer film include a method of arranging a plurality of extruders and T dies continuously, and stacking extruded film-like molten resins to obtain a multilayer film, a method of laying a film-like molten resin on a monolayer film formed to obtain a multilayer film, and a method of pressure-bonding a plurality of monolayer films formed to obtain a multilayer film.

Examples of stretching treatment of the (meth)acryl-based resin film include uniaxial stretching and biaxial stretching. Examples of a stretching direction include a machine flow direction of the (meth)acryl-based resin film (MD) [longitudinal stretching], a direction orthogonal to this (TD) [transverse stretching], and a direction oblique to the machine flow direction (MD). The biaxial stretching may be simultaneous biaxial stretching of performing stretching in two stretching directions simultaneously, or sequential biaxial stretching of performing stretching in a predetermined direction and, thereafter, performing stretching in other direction. Among them, since adhesiveness to the surface-treatment layer or the polarizing film is more excellent, biaxial stretching treatment is preferably performed, and sequential biaxial stretching of performing longitudinal stretching treatment, and thereafter, performing transverse stretching treatment is more preferable.

Stretching treatment can be performed, for example, by stretching a film in a longitudinal direction (machine flow direction: MD) using two or more pairs of nip rolls having a greater circumferential speed on an exit side, or widening a film in a direction orthogonal to a machine flow direction (TD) while both ends of the film is grasped with a chuck.

The stretching ratio by stretching treatment (in the case of performing stretching treatment at a plurality of stages, the total stretching ratio of accumulation of them) is preferably less than or equal to 10 times, and more preferably less than or equal to 9 times. When the stretching ratio is greater than 10 times, there is a tendency that the film thickness is so thin that a film is easily fractured and handling property is deteriorated. The stretching ratio by stretching treatment is preferably greater than or equal to 1.1 times, more preferably greater than or equal to 1.5 times.

The stretching temperature is set at a temperature higher than or equal to the temperature at which the whole (meth)acryl-based resin film exhibits so flowability as to be stretchable, and is preferably in the range from −40° C. to +40° C., and more preferably in the range from −30° C. to +30° C. of the glass transition temperature of the (meth)acryl-based resin constituting the (meth)acryl-based resin film.

Pre-heating treatment of pre-heating the unstretched (meth)acryl-based resin film prior to stretching treatment may be performed. The temperature for pre-heating treatment is preferably in the range from (stretching temperature −50)° C. to the stretching temperature, and more preferably in the range from (stretching temperature −40)° C. to the stretching temperature.

In addition, heat fixing treatment is preferably performed after stretching treatment. Heat fixing treatment is treatment of performing heat treatment at a temperature higher than or equal to the predetermined temperature, while the tension state is maintained in the state where ends of the stretched film are grasped with clips. Generally, the temperature for heat fixing treatment is preferably in the range from the glass transition temperature of the (meth)acryl-based resin to (glass transition temperature +40)° C., and more preferably in the range from (glass transition temperature +10)° C. to (glass transition temperature +35)° C.

In the above-mentioned method for producing the stretched film including the (meth)acryl-based resin, a method of adjusting the absolute value of a planar orientation coefficient ΔP to less than or equal to $2.5 \times 10^{-4}$ is not particularly limited, and in both of the case where the stretched film is a uniaxially stretched film, and the case where the stretched film is a biaxially stretched film, the absolute value of a planar orientation coefficient ΔP can be effectively controlled in the above range, for example, by providing heat fixing treatment after stretching treatment (preferably, performing pre-heating treatment, stretching treatment, and heat fixing treatment in this order), and appropriately adjusting the temperature for heat fixing treatment.

Specifically, when heat fixing treatment is carried out at a temperature ranging from (glass transition temperature of (meth)acryl-based resin +20)° C. to (glass transition temperature +30)° C., the stretched film having the absolute value of the planar orientation coefficient ΔP controlled in the above range is easily obtained. In the case where the stretched film is produced by sequential biaxial stretching, the absolute value of the planar orientation coefficient ΔP depends on, particularly, the temperature for heat fixing treatment in stretching which is performed later (for example, transverse stretching in the case where, after longitudinal stretching is performed, transverse stretching is performed). Therefore, in the case where the stretched film is produced by sequential biaxial stretching, at least the temperature for heat fixing treatment in stretching which is performed later is adjusted in the above range.

In the case where the absolute value of the planar orientation coefficient ΔP is controlled by adjusting the temperature for heat fixing treatment, the absolute value of the planar orientation coefficient ΔP of the whole of the resulting stretched film is usually controlled in the above range.

<Polarizing Plate>

A polarizing plate of the present invention includes a polarizing film, and the protective film of the present invention laminated on at least one surface of the polarizing film. In the polarizing plate of the present invention, the protective film according to the present invention may be laminated on both surfaces of the polarizing film, or the protective film according to the present invention may be laminated on one surface of the polarizing film, and other transparent resin film which is other protective film or phase retardation film may be laminated on the other surface. Such protective film, transparent resin film and polarizing film can be stuck using an adhesive.

Since the protective film according to the present invention is used in the polarizing plate, adhesiveness between the protective film and the polarizing film with an adhesive layer interposed therebetween can be improved.

(1) Polarizing Film

The polarizing film can be produced through a step of uniaxially stretching a polyvinyl alcohol-based resin film, a step of coloring the polyvinyl alcohol-based resin film with a dichroic colorant, thereby allowing the film to adsorb the dichroic colorant, a step of treating the polyvinyl alcohol-based resin film with the dichroic colorant adsorbed thereon with an aqueous boric acid solution, and a step of washing the film with water after the treatment with an aqueous boric acid solution, according to a known method. The polarizing film thus obtained has an absorption axis in the aforementioned uniaxially stretched direction.

As the polyvinyl alcohol-based resin, a saponified polyvinyl acetate-based resin can be used. Examples of the polyvinyl acetate-based resin include a copolymer of vinyl acetate and other monomer copolymerizable therewith, in addition to polyvinyl acetate which is a homopolymer of vinyl acetate. Examples of other monomer copolymerizable with vinyl acetate include unsaturated carboxylic acids, olefins, vinyl ethers, unsaturated sulfonic acids, and acrylamides having an ammonium group.

The saponification degree of the polyvinyl alcohol-based resin is usually 85 to 100% by mol, and preferably greater than or equal to 98% by mol. The polyvinyl alcohol-based resin may be modified, and for example, polyvinyl formal or polyvinyl acetal modified with aldehydes can also be used. In addition, the polymerization degree of the polyvinyl alcohol-based resin is usually about 1000 to 10000, and preferably about 1500 to 5000.

A film formed by such a polyvinyl alcohol-based resin is used as a raw film of the polarizing film. A method of forming the film of the polyvinyl alcohol-based resin is not particularly limited, and a known method is adopted. The film thickness of the polyvinyl alcohol-based raw film is not particularly limited, and is, for example, about 10 to 150 μm.

Uniaxial stretching of the polyvinyl alcohol-based resin film can be performed before coloring with a dichroic colorant, at the same time with the coloring, or after the coloring. In the case where uniaxial stretching is performed after the coloring, this uniaxial stretching may be performed before boric acid treatment or during boric acid treatment. Alternatively, uniaxial stretching can also be performed at a plurality of stages of them.

Uniaxial stretching may be performed by allowing the film to pass through a space between rolls apart from each other, having a different circumferential speed, or niping the film with heat rolls. In addition, this uniaxial stretching may be dry stretching of performing stretching in the atmosphere, or may be wet stretching of performing stretching in the state where the polyvinyl alcohol-based resin film is swollen using water or a solvent such as an organic solvent. The stretching ratio is usually about 3 to 8 times.

Coloring of the polyvinyl alcohol-based resin film with a dichroic colorant can be performed, for example, by a method of immersing the polyvinyl alcohol-based resin film in an aqueous solution containing a dichroic colorant. As the dichroic colorant, iodine or a dichroic organic dye is used. In addition, it is preferable that the polyvinyl alcohol-based resin film is subjected to immersion treatment in water before coloring treatment.

In the case where iodine is used as the dichroic colorant, usually, a method of immersing the polyvinyl alcohol-based resin film in an aqueous solution containing iodine and potassium iodide to color the film is adopted. The content of iodine in this aqueous solution is usually about 0.01 to 1 part by weight per 100 parts by weight of water. The content of potassium iodide is usually about 0.5 to 20 parts by weight per 100 parts by weight of water. The temperature of the aqueous solution used in coloring is usually about 20 to 40° C. In addition, the time for immersion in this aqueous solution (coloring time) is usually about 20 to 1800 seconds.

On the other hand, in the case where the dichroic organic dye is used as the dichroic colorant, usually, a method of immersing the polyvinyl alcohol-based resin film in an aqueous solution containing a water-soluble dichroic organic dye to color the film is adopted. The content of the dichroic organic dye in this aqueous solution is usually about $1 \times 10^{-4}$ to 10 parts by weight, and preferably about $1 \times 10^{-3}$ part by weight per 100 parts by weight of water. This aqueous solution may contain an inorganic salt such as sodium sulfate as a coloring aid. The temperature of the aqueous dichroism dye solution used in coloring is usually about 20 to 80° C. In addition, the time for immersion in this aqueous solution (coloring time) is usually about 10 to 1800 seconds.

Boric acid treatment after coloring with the dichroic colorant can be performed by a method of immersing a colored polyvinyl alcohol-based resin film in an aqueous boric acid-containing solution. The content of boric acid in the aqueous boric acid-containing solution is usually about 2 to 15 parts by weight, and preferably 5 to 12 parts by weight per 100 parts by weight of water. In the case where iodine is used as the dichroic colorant, this aqueous boric acid-containing solution preferably contains potassium iodide. The content of potassium iodide in the aqueous boric acid-containing solution is usually about 0.1 to 15 parts by weight, and preferably 5 to 12 parts by weight per 100 parts by weight of water. The time for immersion in the aqueous boric acid-containing solution is usually about 60 to 1200 seconds, preferably 150 to 600 seconds, and further preferably 200 to 400 seconds. The temperature of the aqueous boric acid-containing solution is usually higher than or equal to 50° C., preferably 50 to 85° C., and further preferably 60 to 80° C.

The polyvinyl alcohol-based resin film after boric acid treatment is usually treated with water washing. Treatment with water washing is performed, for example, by immersing a boric acid-treated polyvinyl alcohol-based resin film in water. The temperature of water in the treatment with water washing is usually about 5 to 40° C. In addition, the immersion time is usually about 1 to 120 seconds.

After water washing, drying treatment is performed to obtain a polarizing film. Drying treatment can be performed using a hot air dryer or a far infrared heater. The temperature for drying treatment is usually about 30 to 100° C., and preferably 50 to 80° C. The time of drying treatment is usually about 60 to 600 seconds, and preferably 120 to 600 seconds.

By drying treatment, the moisture rate of the polarizing film is reduced to the practical degree. The moisture rate is usually 5 to 20% by weight, and preferably 8 to 15% by weight. When the moisture rate is lower than 5% by weight, flexibility of the polarizing film may be lost, or the polarizing film may be damaged or fractured after drying thereof. On the other hand, when the moisture rate is more than 20% by weight, heat stability of the polarizing film tends to be deficient.

The thickness of the polarizing film thus obtained, on which the dichroic colorant is adsorbed and oriented, can be usually about 5 to 40 μm.

(2) Transparent Resin Film

As stated above, other transparent resin film can be stuck to a surface opposite to a surface of the polarizing film, to which the protective film according to the present invention is stuck. The transparent resin film can be a protective film or a phase retardation film for a polarizing plate.

The transparent resin film can be, for example, a triacetylcellulose film, a polycarbonate film, a polyethylene terephthalate film, a (meth)acryl-based resin film, a laminated film of a (meth)acryl-based resin layer and a polycarbonate-based resin layer, or an olefin-based resin film. Among them, the olefin-based resin film is preferably used.

The olefin-based resin is a resin obtained by polymerizing a linear olefin monomer such as ethylene and propylene, or a cyclic olefin monomer such as norbornene or other cyclopentadiene derivative using a catalyst for polymerization.

Examples of the olefin-based resin obtained from the linear olefin monomer include a polyethylene-based resin and a polypropylene-based resin. Among them, a polypropylene-based resin which is a homopolymer of propylene is preferable. In addition, a polypropylene-based copolymerized resin obtained by copolymerizing propylene as a main component, and a comonomer copolymerizable therewith at a ratio of usually 1 to 20% by weight, preferably at a ratio of 3 to 10% by weight is also preferable.

As the comonomer copolymerizable with propylene, ethylene, 1-butene or 1-hexene is preferable. Among them, since transparency or stretching processability is relatively excellent, ethylene is preferably used, and a polypropylene-based copolymerized resin obtained by copolymerizing ethylene at a ratio of 1 to 20% by weight, particularly 3 to 10% by weight is one of preferable resins. The copolymerization ratio of ethylene is greater than or equal to 1% by weight to thereby exert the effect of enhancing transparency or stretching processability. On the other hand, when the ratio exceeds 20% by weight, the melting point of a resin is lowered, and heat resistance required for the protective film or the phase retardation film may be deteriorated.

As the polypropylene-based resin, a commercial product is easily available, and examples include "Prime Polypro" sold from Prime Polymer Co., Ltd., "Novatec" and "Wintec" sold from Japan Polypropylene Corporation, "Sumitomo Noblen" sold from Sumitomo Chemical Co., Ltd., and "SunAllomer" sold from SunAllomer Ltd., each of which is expressed by a trade name.

The olefin-based resin obtained by polymerizing a cyclic olefin monomer is generally also called a cyclic olefin-based resin, an alicyclic olefin-based resin, or a norbornene-based resin. Herein, such an olefin-based resin is referred to as a cyclic olefin-based resin.

Examples of the cyclic olefin-based resin include resins obtained by performing ring-opening metathesis polymerization of norbornene obtained from cyclopentadiene and olefins by a Diels-Alder reaction or a derivative thereof as a monomer, followed by hydrogenation; resins obtained by performing ring-opening metathesis polymerization of tetracyclododecene obtained from dicyclopentadiene, and olefins or (meth)acrylic acid esters by a Diels-Alder reaction or a derivative thereof as a monomer, followed by hydrogenation; resins obtained by performing similarly ring-opening metathesis copolymerization using two or more of norbornene, tetracyclododecene, derivatives thereof, and other cyclic olefin monomer, followed by hydrogenation; and resins obtained by addition-copolymerizing at least one cyclic olefin selected from the aforementioned norbornene, tetracyclododecene and derivatives thereof, and an aliphatic or aromatic compound having a vinyl group.

As the cyclic olefin-based resin, a commercial product is easily available, and examples include "TOPAS" produced by TOPAS ADVANCED POLYMERS GmbH in Germany and sold from Polyplastics Co., Ltd. in Japan, "Arton" produced by and sold from JSR Corporation, "Zeonor" and "Zeonex" produced by and sold from ZEON Corporation, and "Apel" produced by and sold from Mitsui Chemicals, Inc., each of which is expressed by a trade name.

The linear olefin-based resin or cyclic olefin-based resin can be formed into a film to thereby form a transparent resin film stuck to one surface of the polarizing film. A method of forming a resin into a film is not particularly limited, and a melt extrusion film-forming method is preferably adopted.

As the olefin-based resin film, a commercial product is easily available, and as a polypropylene-based resin film, examples thereof include "FILMAX CPP Film" sold from Filmax Corp., "Sun Tox" sold from Sun Tox Co., Ltd., "Tohcello" sold from Tohcello Co., Ltd., "Toyobo Pylen Film" sold from Toyobo Co., Ltd., "Torayfan" sold from Toray Advanced Film Co., Ltd., "Nippon Polyace" sold from Nippon Polyace Co., Ltd., and "Taikoh FC" sold from Futamura Chemical Co., Ltd., each of which is expressed by a trade name. In addition, as the cyclic olefin-based resin film, examples thereof include "Zeonor Film" sold from ZEON Corporation and "Arton Film" sold from JSR Corporation, each of which is expressed by a trade name.

An optically functional film can be laminated, or an optically functional layer can be applied on a surface of the transparent resin film. Examples of such an optically functional film and an optically functional layer include an easily adhesive layer, an electrically conductive layer, and a hard coat layer.

The above-described olefin-based resin film can be stretched to have refractive index anisotropy, thereby imparting the function of a phase retardation film. A stretching method may be appropriately selected depending on required refractive index anisotropy, and is not particularly limited, and for example, longitudinal uniaxial stretching, transverse uniaxial stretching or longitudinal and transverse sequential biaxial stretching is adopted.

Since the olefin-based resin has positive refractive index anisotropy, and refractive index is greatest in the direction of application of stress, a film obtained by uniaxially stretching it usually gives refractive index anisotropy of $n_x > n_y \approx n_z$ (meanings of $n_x$, $n_y$ and $n_z$ are as described above). A film obtained by sequentially biaxially stretching the olefin-based resin usually gives refractive index anisotropy of $n_x > n_y > n_z$.

In addition, a phase retardation film can also be produced by a method of sticking a heat shrinkable film to an intended film, and shrinking the films in place of stretching processing, or together with stretching processing, in order to impart a desired refractive index property. This operation is usually performed for obtaining a phase retardation film having refractive index anisotropy of $n_x > n_z > n_y$ or $n_z > n_x \geq n_y$.

The phase retardation film including the olefin-based resin is also easily available as a commercial product. Examples of the phase retardation film including the cyclic olefin-based resin include "Zeonor Film" sold from ZEON Corporation, "Arton Film" sold from JSR Corporation, and "ESSINA Phase Retardation Film" sold from Sekisui Chemical Co., Ltd., each of which is expressed by a trade name.

(3) Adhesive

For sticking the protective film according to the present invention and the polarizing film, or sticking the polarizing film and the transparent resin film, an adhesive is used as described above. It is preferable that, prior to sticking, at least one of a sticking surface of the protective film according to the present invention to the polarizing film and a sticking surface of the polarizing film to the protective film according to the present invention, and at least one of a sticking surface of the polarizing film to the transparent resin film and a sticking surface of the transparent resin film to the polarizing film are subjected to corona discharge treatment, plasma irradiation treatment, electron beam irradiation treatment, or other surface activating treatment in advance.

The adhesive used for sticking can be arbitrarily selected from adhesives exhibiting an adhesive force to a film to be stuck. Typically, examples include an aqueous adhesive, that is, an adhesive in which an adhesive component is dissolved in water, or an adhesive component is dispersed in water, and an active energy ray curable adhesive including a component which is cured by irradiation with an active energy ray. From the viewpoint of productivity, an active energy ray curable adhesive is preferably used.

First, the aqueous adhesive is described. For example, a composition using a polyvinyl alcohol-based resin or a urethane resin as a main component is exemplified as a preferable adhesive.

In the case where a polyvinyl alcohol-based resin is used as the main component of the aqueous adhesive, the polyvinyl alcohol-based resin may be a modified polyvinyl alcohol-based resin such as carboxyl group-modified polyvinyl alcohol, acetoacetyl group-modified polyvinyl alcohol, methylol group-modified polyvinyl alcohol, and amino group-modified polyvinyl alcohol, in addition to partially saponified polyvinyl alcohol and completely saponified polyvinyl alcohol. In the case where the polyvinyl alcohol-based resin is used as an adhesive component, the adhesive is prepared as an aqueous solution of the polyvinyl alcohol-based resin in many cases. The concentration of the polyvinyl alcohol-based resin in the aqueous adhesive solution is usually about 1 to 10 parts by weight, and preferably 1 to 5 parts by weight, based on 100 parts by weight of water.

A curable component or a crosslinking agent such as glyoxal and a water-soluble epoxy resin is preferably added to the aqueous adhesive including the polyvinyl alcohol-based resin as a main component in order to enhance adhesion property. Examples of the water-soluble epoxy resin include a polyamide polyamine epoxy resin obtained by reacting with epichlorohydrin, polyamide polyamine obtained by a reaction of polyalkylene polyamine such as diethylene triamine and triethylene tetramine with dicarboxylic acid such as adipic acid. As a commercial product of such a polyamide polyamine epoxy resin, there are, for example, "Sumirez Resin 650" and "Sumirez Resin 675" sold from Taoka Chemical Co., Ltd., and "WS-525" sold from Nippon PMC Co., Ltd., and these can be suitably used. The amount of such a curable component or crosslinking agent added is usually 1 to 100 parts by weight, and preferably 1 to 50 parts by weight based on 100 parts by weight of the polyvinyl alcohol-based resin. When the amount added is small, the effect of improving adhesion property is reduced, and on the other hand, when the amount added is large, an adhesive layer tends to be brittle.

In the case where a urethane resin is used as the main component of the aqueous adhesive, examples of an appropriate adhesive composition include a mixture of a polyester-based ionomer-type urethane resin and a compound having a glycidyloxy group. The polyester-based ionomer-type urethane resin as used herein refers to a urethane resin having a polyester skeleton, in which a small amount of an ionic component (hydrophilic component) is introduced. Since the ionomer-type urethane resin is directly emulsified in water to be an emulsion without using an emulsifying agent, it is suitable as an aqueous adhesive. Use of the polyester-based ionomer-type urethane resin for adhering the polarizing film and the protective film is described in, for example, Japanese Patent Laying-Open No. 2005-70139, Japanese Patent Laying-Open No. 2005-70140, and Japanese Patent Laying-Open No. 2005-181817.

On the other hand, in the case where the active energy ray curable adhesive is used, a component constituting it, which is cured by irradiation with an active energy ray (hereinafter, simply referred to as "curable component" in some cases), can be an epoxy compound, an oxetane compound, a (meth) acryl-based compound, or the like. In the case where a cationically polymerizable compound such as an epoxy compound and an oxetane compound is used, a cationic polymerization initiator is blended. In addition, in the case where a radically polymerizable compound such as a (meth) acryl-based compound is used, a radical polymerization initiator is blended. Among them, an adhesive including an epoxy compound as one of curable components is preferable, and particularly, an adhesive including an alicyclic epoxy compound, in which an epoxy group is directly bound to a saturated carbocyclic ring, as one of curable components is preferable. In addition, it is also effective to use an oxetane compound in combination.

As the epoxy compound, a commercial product is easily available, and there are, for example, "Epikote" series sold from Japan Epoxy Resin Co., Ltd., "Epiclon" series sold from DIC Corporation, "Epototo" series sold from Totokasei Co., Ltd., "Adeka Resin" series sold from ADEKA Corporation, "Denacol" series sold from Nagase ChemteX Corporation, "Dow Epoxy" series sold from The Dow Chemical Company, and "Tepic" sold from Nissan Chemical Industries, Ltd., each of which is expressed by a trade name.

As the alicyclic epoxy compound in which an epoxy group is directly bound to a saturated carbocyclic ring, a commercial product is easily available, and there are, for example, "Celloxide" series and "Cyclomer" series sold from Daicel Corporation, and "Cyracure" series sold from The Dow Chemical Company, each of which is expressed by a trade name.

As the oxetane compound, a commercial product is easily available, and there are, for example, "Arone Oxetane" series sold from Toagosei Co., Ltd. and "ETERNACOLL" series sold from Ube Industries, Ltd., each of which is expressed by a trade name.

As the cationic polymerization initiator, a commercial product is easily available, and there are, for example, "Kayarad" series sold from Nippon Kayaku Co;, Ltd., "Cyracure" series sold from Union Carbide Corporation, a photoacid generator "CPI" series sold from San-Apro Ltd., photoacid generators "TAZ", "BBI" and "DTS" sold from Midori Kagaku Co., Ltd., "Adeka Optomer" series sold from Adeka Corporation, and "RHODORSIL" series sold from Rhodia, each of which is expressed by a trade name.

The active energy ray curable adhesive can contain a photosensitizer, if necessary. The photosensitizer can be used to thereby improve reactivity, and to further improve mechanical strength and adhesion strength of an adhesive layer. Examples of the photosensitizer include a carbonyl compound, an oraganosulfur compound, persulfide, a redox-based compound, azo and diazo compounds, an anthracene-based compound, a halogen compound, and a photoreductive pigment.

In addition, the active energy ray curable adhesive can be blended with various additives as long as adhesion property thereof is not deteriorated. Examples of the additive include an ion trapping agent, an antioxidant, a chain transfer agent, a tackiness imparting agent, a thermoplastic resin, a filler, a fluidity controlling agent, a plasticizer, and an anti-foaming agent. Further, the active energy ray curable adhesive can be blended with a curable component to be cured by the reaction mechanism different from that of cationic polymerization as long as adhesion property thereof is not deteriorated.

In the case where sticking of a film is performed using the active energy ray curable adhesive, films are stuck to each other with a layer of the adhesive, interposed therebetween, and then irradiated with an active energy ray, and thus the adhesive layer is cured. The active energy ray curable adhesive used for one surface of the polarizing film, and the active energy ray curable adhesive used in the other surface may have the same composition, or may have different composition, and irradiations with an active energy ray for curing both of them are preferably performed at the same time.

The active energy ray used for curing the active energy ray curable adhesive can be, for example, X-ray having a wavelength of 1 to 10 nm, an ultraviolet ray having a wavelength of 10 to 400 nm, or a visible ray having a wavelength of 400 to 800 nm. Among them, an ultraviolet ray is preferably used in respects of easiness of utilization, as well as easiness of preparation of the active energy ray curable adhesive, stability and curing performance. As a light source for an ultraviolet ray, for example, a low pressure mercury lamp, an intermediate pressure mercury lamp, a high pressure mercury lamp, an ultrahigh pressure mercury lamp, a chemical lamp, a black light lamp, a microwave-excited mercury lamp, a metal halide lamp or the like having light emission distribution at a wavelength of less than or equal to 400 nm can be used.

The thickness of the adhesive layer obtained using the active energy ray curable adhesive is usually about 1 to 50 µm, and particularly preferably in the range of 1 to 10 µm.

Since the polarizing plate of the present invention is such that, as a protective film to be stuck to a polarizing film, the protective film of the present invention is applied, the plate is excellent in adhesiveness between the protective film and the polarizing film, and has high durability.

The polarizing plate of the present invention can be suitably used as a polarizing plate constituting a liquid crystal panel used in a liquid crystal display device, and particularly, is suitable as a polarizing plate arranged on a visible side of a liquid crystal cell. In the case where the polarizing plate of the present invention is arranged on a visible side of a liquid crystal cell, a polarizing plate arranged on a rear side of a liquid crystal cell may be the polarizing plate according to the present invention, or may be other polarizing plate. A liquid crystal cell constituting a liquid crystal panel may be various liquid crystal cells which are used in this field.

Sticking of the polarizing plate to the liquid crystal cell can be performed with a pressure-sensitive adhesive layer interposed therebetween, the layer being formed on a surface of the polarizing plate in advance. This pressure-sensitive adhesive layer can be laminated on one protective film (or phase retardation film) possessed by the polarizing plate, and for example, in a polarizing plate in which the protective film of the present invention is stuck to one surface of a polarizing film and the aforementioned other transparent resin film is stuck to the other surface, a pressure-sensitive adhesive layer can be provided on an outer surface of the transparent resin film. When this polarizing plate is stuck to a liquid crystal cell as a visible side polarizing plate with a pressure-sensitive adhesive layer interposed therebetween, a liquid crystal panel in which the protective film of the present invention is arranged on a visible side is obtained.

In general, the pressure-sensitive adhesive layer is formed with a (meth)acryl-based pressure-sensitive adhesive including (meth)acrylic acid ester as a main component, and including a (meth)acryl-based resin copolymerized with a functional group-containing (meth)acryl-based monomer, as a pressure-sensitive adhesive component.

EXAMPLES

The present invention will be described more specifically below by way of Examples, but the present invention is not limited by these Examples. In Examples, % and part(s) expressing the content or the use amount are based on weight, unless otherwise indicated.

Example 1

As a (meth)acryl-based resin, a pellet-like copolymer resin in which the weight ratio of methyl methacrylate/methyl acrylate was 96/4 was prepared. The glass transition temperature of this copolymer resin was 108° C. The glass transition temperature Tg as used herein refers to the intermediate point glass transition temperature measured by raising the temperature of the pellet-like copolymer resin to 150° C. at a temperature raising rate of 20° C./min, holding the temperature for 5 minutes, lowering the temperature to −50° C. at a temperature lowering rate of 10° C./min, holding the temperature for 1 minute, and then, raising the temperature from −50° C. to 210° C. at a temperature raising rate of 10° C./min, in a nitrogen flow rate of 100 ml/min, according to differential scanning calorimetry based on JIS K7121:1987, using a DSC apparatus ("DSC7020" manufactured by Seiko Instruments Inc.).

As a rubber particle, a rubber elastic body particle of a three-layer structure composed of innermost layer/intermediate layer/outermost layer was prepared. In this rubber elastic body particle, the innermost layer was made of a hard polymer obtained by polymerization using methyl methacrylate and a small amount of allyl methacrylate, the intermediate layer was made of a soft elastic body (acryl-based elastic polymer) obtained by polymerization using butyl acrylate as a main component, and further, styrene and a small amount of allyl methacrylate, and the outermost layer was made of a hard polymer obtained by polymerization using methyl methacrylate and a small amount of ethyl acrylate, and the average particle diameter of the rubber particle measured by the aforementioned method using ruthenium oxide was 240 nm.

The pellet-like copolymer resin and the rubber particles were placed into an extruder at a ratio so that the added amount of the rubber particles was as shown in Table 1 (30%), and the mixture was melt-kneaded by heating to obtain a liquid molten-kneaded product. This molten-kneaded product was solidified using a cooling roll while it was continuously extruded into a film from a T die, to produce a long unstretched (meth)acryl-based resin film having a thickness of 120 μm. The added amount of the rubber particles (%) shown in Table 1 is % by weight based on the total amount of the (meth)acryl-based resin and the rubber particles.

Then, the resulting unstretched (meth)acryl-based resin film was subjected to longitudinal-transverse sequential biaxial stretching treatment by the following procedure. First, after pre-heating treatment of performing pre-heating at (Tg+30)° C. was conducted, longitudinal stretching was performed at (Tg+30)° C. (stretching ratio: 2.0 times) by stretching between rolls, and thereafter, heat fixing treatment of heat-treating a film after longitudinal stretching was performed at (Tg+30)° C. Tg means the glass transition temperature (108° C.) of the (meth)acryl-based resin (the same shall apply hereinafter).

Subsequently, after the longitudinally stretched film was subjected to pre-heating treatment of pre-heating at (Tg+30)° C., transverse stretching was performed at (Tg+30)° C. (stretching ratio: 2.0 times) by stretching between rolls, and thereafter, heat fixing treatment of heat-treating a film after transverse stretching was performed at (Tg+30)° C. to obtain a protective film for a polarizing plate which was a biaxially stretched film.

The temperature of pre-heating treatment, the stretching temperature and the temperature of heat fixing treatment (The temperature of pre-heating treatment, the stretching temperature and the temperature of heat fixing treatment in longitudinal stretching, and the temperature of pre-heating treatment, the stretching temperature and the temperature of heat fixing treatment in transverse stretching are the same. The same shall apply in Examples 2 to 5, and Comparative Examples 1 to 4.), the stretching ratios in longitudinal stretching and transverse stretching, and the thickness of each of the resulting biaxially stretched films are summarized in Table 1. The stretching ratio in longitudinal stretching is the stretching ratio based on the unstretched (meth)acryl-based resin film, and the stretching ratio in transverse stretching is the stretching ratio based on the longitudinally stretched film.

Examples 2 to 5

Comparative Examples 1 to 4

Protective films for a polarizing plate which were each a biaxially stretched film were produced according to the same manner as that of Example 1 except that the added amount of the rubber particles (%), the stretching temperature in longitudinal stretching and transverse stretching, the temperature of heat fixing treatment, and the stretching ratio were as shown in Table 1.

TABLE 1

| | Amount of rubber particles added (wt %) | Temperature of pre-heating (° C.) | Stretching temperature (° C.) | Temperature of heat fixing treatment (° C.) | Stretching ratio [longitudinal × transverse] (time) | Thickness of biaxially stretched film (μm) |
|---|---|---|---|---|---|---|
| Example 1 | 30 | Tg + 30 | Tg + 30 | Tg + 30 | 2.0 × 2.0 | 31.8 |
| Example 2 | 30 | Tg + 30 | Tg + 30 | Tg + 30 | 2.5 × 2.5 | 44.9 |
| Example 3 | 30 | Tg + 30 | Tg + 30 | Tg + 30 | 3.0 × 3.0 | 50.5 |
| Example 4 | 20 | Tg + 30 | Tg + 30 | Tg + 30 | 2.0 × 2.0 | 46.0 |
| Example 5 | 10 | Tg + 30 | Tg + 30 | Tg + 30 | 2.0 × 2.0 | 42.9 |
| Comparative Example 1 | 30 | Tg + 10 | Tg + 10 | Tg + 10 | 2.0 × 2.0 | 46.8 |

TABLE 1-continued

|  | Amount of rubber particles added (wt %) | Temperature of pre-heating (° C.) | Stretching temperature (° C.) | Temperature of heat fixing treatment (° C.) | Stretching ratio [longitudinal × transverse] (time) | Thickness of biaxially stretched film (μm) |
|---|---|---|---|---|---|---|
| Comparative Example 2 | 30 | Tg + 10 | Tg + 10 | Tg + 10 | 2.5 × 2.5 | 33.4 |
| Comparative Example 3 | 20 | Tg + 10 | Tg + 10 | Tg + 10 | 2.0 × 2.0 | 48.3 |
| Comparative Example 4 | 10 | Tg + 10 | Tg + 10 | Tg + 10 | 2.0 × 2.0 | 35.9 |

Regarding the protective films obtained in respective Examples and Comparative Examples, the following physical properties were measured and the following adhesiveness evaluating tests were performed. The results are shown in Table 2.

(1) In-Plane Phase Retardation Value $R_0$ and Thickness-Directional Phase Retardation Value $R_{th}$ Using a phase retardation measuring apparatus "KOBRA-WR" manufactured by Oji Scientific Instruments, an in-plane phase retardation value $R_0$ and an inclined phase retardation value (40° inclined) at a wavelength of 590 nm were measured (average refractive index was 1.49), three-dimensional refractive indexes $n_x$, $n_y$ and $n_z$ at a wavelength of 590 nm were calculated from these measured values (meanings of $n_x$, $n_y$ and $n_z$ are as described above), and a thickness-directional phase retardation value $R_{th}$ was determined based on the following expression:

$$R_{th}=[(n_x+n_y)/2-n_z]\times d$$

(d: thickness of biaxially stretched film).

The in-plane phase retardation value $R_0$ is defined by the following expression:

$$R_0=(n_x-n_y)\times d$$

(2) Planar Orientation Coefficient ΔP and $N_Z$ Coefficient

From the three-dimensional refractive indexes obtained by using the "KOBRA-WR", a planar orientation coefficient ΔP and a $N_Z$ coefficient were calculated according to the aforementioned definition expressions. In all of Examples and Comparative Examples, ΔP was a negative value, but Table 2 indicates the absolute value thereof.

(3) Test of Evaluating Adhesiveness to Polarizing Film

The resulting protective film was stuck to one surface of a polarizing film (thickness: 23 μm) which was a uniaxially stretched polyvinyl alcohol film with iodine adsorbed and oriented thereon, using an active energy ray curable adhesive, and a cyclic olefin-based resin film ("Zeonor Film" sold from ZEON Corporation, thickness: 50 μm) was stuck to the other surface using the same active energy ray curable adhesive. Sticking surfaces of the protective film and the cyclic olefin-based resin film were subjected to corona treatment, respectively, prior to sticking. Corona treatment was performed three times continuously, using a corona treating apparatus (high frequency power supply: "CT-0212" manufactured by Kasuga Electric Works Ltd., oscillator body: "CT-0212" manufactured by Kasuga Electric Works Ltd., and high voltage transformer: "CT-T022" manufactured by Kasuga Electric Works Ltd.), under conditions of an output of 280 W, a line speed of 1.0 m/min, an ambient temperature of 23° C. and an ambient relative humidity of 55% RH, while a distance between a protective film surface and a cyclic olefin-based resin film surface, and an electrode of the corona treating apparatus was adjusted to 3 mm.

As the active energy ray curable adhesive, an adhesive including an epoxy compound as a curable component and a cation polymerization initiator was used.

Then, a laminated film after sticking was allowed to pass through an ultraviolet ray irradiation apparatus manufactured by Japan Storage Battery Co., Ltd. (as an ultraviolet ray lamp, "HAL400NL" was used at 80W, and an irradiation distance was 50 cm) once at a line rate of 1.0 m/min, and thus the active energy ray curable adhesive was cured to obtain a polarizing plate.

The resulting polarizing plate was cut out into a size of 200 mm in length×25 mm in width so that an absorption axis of a polarizing film was parallel with a long side, to obtain a sample for evaluation. The sample for evaluation was stuck to a glass plate with an acryl-based pressure-sensitive adhesive interposed therebetween, on a (meth)acryl-based resin film side, and allowed to stand for one day under an atmosphere of a temperature of 23° C. and a relative humidity of 60%. Thereafter, a peeling test of peeling the sample at a peeling speed of 300 mm/min at the interface between the polarizing film and the (meth)acryl-based resin film in a 180° direction was performed. The peeling strength (adhesive force) (N/25 mm) at that time was measured using "Autograph ASG-50NX" manufactured by Shimadzu Corporation.

(4) Test of Evaluating Adhesiveness to Surface-Treatment Layer

On one surface of the resulting biaxially stretched film, a surface-treatment layer was formed by the following procedure. A photocurable resin composition containing pentaerythritol triacrylate and polyfunctional urethanized acrylate (reaction product of hexamethylene diisocyanate and pentaerythritol triacrylate) at a weight ratio of 60/40, in which they were dissolved in ethyl acetate so that the total concentration of both of them was 60% by weight, and a leveling agent was further blended, was prepared. The pentaerythritol triacrylate and the polyfunctional urethanized acrylate constituting this photocurable resin composition are collectively called "curable acrylate". A photopolymerization initiator "Irgacure 184" manufactured by BASF company was added at 1 part by weight based on 100 parts by weight of the curable acrylate of this photocurable resin composition to prepare a coating liquid for forming a surface-treatment layer.

One surface of the biaxially stretched film was coated with the coating liquid for forming a surface-treatment layer so that the thickness of the coating film after drying was 6 μm, and held in a dryer set at 80° C. for 1 minute to dry the coating film. After drying, light from a high pressure mercury lamp at an intensity of 20 mW/cm$^2$ was radiated from the coating film side of the film so that the light amount in terms of h ray was 400 mJ/cm², to cure the coating film layer of the photocurable resin composition to form a surface-treatment layer, thus producing a protective film with a surface-treatment layer.

By a cross hatch test in accordance with JIS K 5600-5-6, adhesiveness between the surface-treatment layer and the biaxially stretched film was evaluated. As a numerical value is higher, adhesiveness is more excellent.

TABLE 2

|  | Amount of rubber particles added (wt %) | Phase retardation value | | $N_z$ coefficient | Planar orientation coefficient $|\Delta P|$ (×10⁻⁴) | Adhesiveness to polarizing film (N/25 mm) | Adhesiveness to surface treatment layer (/100) |
|---|---|---|---|---|---|---|---|
|  |  | $R_0$ (nm) | $R_{th}$ (nm) |  |  |  |  |
| Example 1 | 30 | 0.7 | −7.1 | −2.6 | 1.7 | 5.01 | 100 |
| Example 2 | 30 | 4.6 | −9.6 | −3.3 | 2.0 | 1.42 | 100 |
| Example 3 | 30 | 1.3 | −4.7 | −8.9 | 1.5 | 11.1 | 100 |
| Example 4 | 20 | 2.2 | −7.4 | −2.9 | 1.6 | 5.11 | 100 |
| Example 5 | 10 | 2.3 | −5.5 | −3.8 | 1.1 | 1.65 | 100 |
| Comparative Example 1 | 30 | 4.7 | −19.2 | −2.8 | 4.4 | 0.666 | 82 |
| Comparative Example 2 | 30 | 3.8 | −18.3 | −5.3 | 5.5 | 0.488 | 9 |
| Comparative Example 3 | 20 | 2.5 | −16.8 | −3.2 | 3.6 | 0.748 | 67 |
| Comparative Example 4 | 10 | 3.5 | −15.1 | −2.9 | 3.4 | 0.849 | 68 |

What is claimed is:

1. A protective film for a polarizing plate, wherein the protective film comprises
    a monolayer stretched film comprising a (meth)acryl-based resin and having an absolute value of a planar orientation coefficient $\Delta P$ of less than or equal to $2.5 \times 10^{-4}$.

2. The protective film for a polarizing plate according to claim 1, wherein the stretched film comprises rubber particles.

3. The protective film for a polarizing plate according to claim 1, wherein the stretched film is a biaxially stretched film.

4. The protective film for a polarizing plate according to claim 1, wherein the stretched film has a thickness of 10 to 150 μm.

5. The protective film for a polarizing plate according to claim 1, further comprising a surface-treatment layer laminated on the stretched film.

6. The protective film for a polarizing plate according to claim 1, wherein the stretched film has an thickness-directional phase retardation value $R_{th}$ in a range of −35 to 35 nm.

7. The protective film for a polarizing plate according to claim 1, wherein the stretched film has an in-plane phase retardation value $R_0$ in a range of 0 to 15 nm.

8. A polarizing plate comprising:
    a polarizing film, and
    the protective film for a polarizing plate according to claim 1 laminated on at least one surface of the polarizing film via an adhesive layer.

9. A polarizing plate according to claim 8, wherein the adhesive layer comprises a cured product of at least one component selected from a group consisting of an epoxy compound, an oxetane compound and a (meth)acryl-based compound.

* * * * *